(12) United States Patent
Wallner (10) Patent No.: US 8,387,330 B2
(45) Date of Patent: Mar. 5, 2013

(54) SYSTEM, METHOD AND DEVICE FOR PRODUCING A SUPPORTING FRAMEWORK OR RIGID GIRDER STRUCTURE

(76) Inventor: Ulrich Wallner, Schwabach (DE)

(*) Notice: Subject to any disclaimer, the term of this patent is extended or adjusted under 35 U.S.C. 154(b) by 462 days.

(21) Appl. No.: 12/586,193

(22) Filed: Sep. 18, 2009

(65) Prior Publication Data
US 2010/0083605 A1    Apr. 8, 2010

Related U.S. Application Data

(63) Continuation-in-part of application No. 10/512,409, filed on Jul. 1, 2005, now abandoned.

(51) Int. Cl.
*E04C 3/12* (2006.01)
*E04B 1/38* (2006.01)

(52) U.S. Cl. ........ 52/655.1; 52/653.2; 52/81.3; 403/169; 403/217; 446/124

(58) Field of Classification Search .................. 52/81.3, 52/653.2, 655.1; 446/124, 128; 403/169–176, 403/217, 218
See application file for complete search history.

(56) References Cited

U.S. PATENT DOCUMENTS

| | | | | |
|---|---|---|---|---|
| 1,113,371 A | * | 10/1914 | Fajeau | 446/126 |
| 1,799,501 A | * | 4/1931 | Casler | 43/18.1 R |
| 2,149,476 A | * | 3/1939 | Tetzlaff | 446/126 |
| 2,386,588 A | * | 10/1945 | Brunton et al. | 403/173 |
| 2,561,435 A | | 7/1951 | Woodward | |
| 2,703,724 A | * | 3/1955 | Der Yuen Frank et al. | 403/265 |
| 2,709,318 A | * | 5/1955 | Benjamin | 446/103 |
| 2,803,088 A | * | 8/1957 | Swann | 446/126 |
| 3,380,768 A | * | 4/1968 | Wolfensberger | 52/280 |
| 3,476,421 A | * | 11/1969 | Torres | 403/173 |
| 3,547,275 A | * | 12/1970 | Engel | 211/205 |
| 3,640,018 A | * | 2/1972 | Light | 446/77 |
| 3,864,051 A | * | 2/1975 | Reid | 403/408.1 |
| 3,873,219 A | * | 3/1975 | Pofferi | 403/171 |
| 3,881,830 A | * | 5/1975 | Kato et al. | 403/171 |
| 3,929,230 A | * | 12/1975 | Luthi | 211/194 |
| 4,128,353 A | * | 12/1978 | Lauterbach | 403/175 |
| 4,231,834 A | | 11/1980 | Gonzalez | |
| 4,326,354 A | * | 4/1982 | Hagberg | 446/126 |
| 4,624,090 A | * | 11/1986 | Stienen | 52/655.2 |
| 4,652,170 A | * | 3/1987 | Lew | 403/381 |
| 5,282,767 A | * | 2/1994 | Gelardi | 446/126 |
| 5,690,446 A | * | 11/1997 | Poissant et al. | 403/361 |
| 5,916,105 A | | 6/1999 | Gow | |
| 7,063,481 B2 | * | 6/2006 | Trull | 403/170 |
| 7,374,468 B2 | * | 5/2008 | Flodin et al. | 446/85 |

FOREIGN PATENT DOCUMENTS

| | | | |
|---|---|---|---|
| DE | 8900382.9 | | 6/1989 |
| DE | 3817236 | | 11/1989 |
| DE | 43 33 029 | * | 3/1995 |
| DE | 4333029 | | 3/1995 |
| DE | 4445018 | | 7/1995 |
| EP | 1008768 | | 6/2000 |
| FR | 2 615 269 | * | 11/1988 |
| GB | 852155 | * | 10/1960 |
| GB | 2 158 179 | * | 11/1985 |
| JP | 11-62020 | * | 3/1999 |
| WO | WO 99/49150 | | 9/1999 |

(Continued)

*Primary Examiner* — Robert Canfield
(74) *Attorney, Agent, or Firm* — Pandiscio & Pandiscio (57) ABSTRACT

A system for making a truss from joinable bar elements. The bar elements are at least in part of plant material from high-growing plants. The system further includes connecting elements to interconnect at least two of the bar elements, the bar elements and connecting elements being adapted to be connected to each other to form the truss.

15 Claims, 7 Drawing Sheets

FOREIGN PATENT DOCUMENTS

| WO | 00/55442 | * | 9/2000 |
| WO | WO 00/55442 | | 9/2000 |

\* cited by examiner

SYSTEM, METHOD AND DEVICE FOR PRODUCING A SUPPORTING FRAMEWORK OR RIGID GIRDER STRUCTURE

CROSS-REFERENCE TO RELATED APPLICATIONS

This is a Continuation-In-Part Application based on U.S. application Ser. No. 10/512,409, which now is abandoned.

BACKGROUND OF THE INVENTION

Field of the Invention

The invention relates to a system, a method and a device for producing a truss from bar-elements, which are joined or joinable, and from connection-elements located or placeable between those at their joint places, whereby the bar-elements consist of at least one segment of a material of high-growing plants each, and the connection-elements consist of a rigid, regenerative material. Preferably, connection-elements are provided wherever two or more bar-elements meet whose longitudinal axes are not coaxial to each other.

The inventor has found that natural occurring materials, especially wood, bamboo culms or the like, have very advantageous properties for producing a framework, for example as supporting structure of a house. Such material is much more lighter than for example steel or concrete, and it is much more elastic and little brittle. Additionally, plant material can be cultivated in every desired amount, whereas steel and other materials are limited and are much more difficult to achieve and therefore should be avoided, if possible. On the other hand, at present, there exists no satisfactory connecting structure for connecting two or more bar-elements made from wood, bamboo culms or the like.

BRIEF SUMMARY OF THE INVENTION

From the disadvantages of the described prior art, there arises the problem initiating the invention, to improve a generic system for producing a truss or framework from plant material in such a way, that there results an optimum ratio between efforts and achievement, i.e. that the costs and/or the expenditure of work for producing a building can be decreased, without its stability suffering therefrom.

At a generic system, the solution of this problem is achieved by a system for to supporting a framework, the system comprising bar-elements joinable to form a truss, and connecting elements insertable between said bar-elements at all junctures where two or more bar-elements, whose longitudinal axes are not coaxial to each other, are joined, wherein
a) each of said bar-elements comprises at least one portion of a material is selected from high-growing plants, comprising giant grasses deciduous trees, coniferous trees, palm trees, and bamboo plants, and
b) each of said connecting elements comprises a selected rigid, regenerative material comprising raw material built up by plants using photosynthesis, like wood; and wherein
c) at least one end of a bar-element, a connecting element which is to be mounted to said bar-element, and at least one end of a further bar-element which is to be connected to said connecting element, are provided with surfaces configured as geometrical bodies at least in selected areas,
d) such that at a joint between at least one end of one of said bar-elements and said connecting element which is to be mounted to said bar-element, or the further bar-element, each of the elements exhibits at least in a selected area a surface which runs along a surface generated by a selected one of a cylinder, a cone, a prism and a pyramid, as well as at least in another selected area a surface which is configured as a selected one of a hollow cylinder, a hollow cone, a hollow prism and a hollow pyramid, respectively,
e) whereby multiple of said bar-elements are connected to one connecting element with two or more of said bar-elements having their longitudinal axes not coaxial to each other, and whereby said connecting element comprises at its surface multiple connecting structures in the shape of annular recesses machined into a continuous surface, so that each recess surrounds a core which ends in a front side flush with an area surrounding the recess, the annular recess having two concentric bounding surfaces for the connection of each bar-element, which bounding surfaces permit an assembly by plugging one bar-element into the annular recess of each connecting structure with two pairs of closely adjoining surfaces complementary to each other and glued together in pairs.

High growing plants are reinforced with fibres running in longitudinal direction and therefore show an optimum stability for (tensile) stress along their longitudinal direction. On the other hand, since buildings produced by the system according to the invention are broken up into trusses with nodes and straight connections between those, it is not required that the bar-elements have a high bending strength. Therefore, fibres running slantwise or transversal with regard to the longitudinal axis of the bar element, and in particular those running in radial directions or crosswise with regard to each other, can be renounced. By using regenerative raw materials for the bar-elements, the use of expensive chemicals can be saved, which furthermore come from fossil and therefore only limited available materials. Furthermore, regenerative raw materials are built up by photosynthesis, whereby the carbon, which is required for a multitude of organic compounds, is abstracted from the carbon dioxide of the air; therefore, its climate-changing effect as a greenhouse gas is reduced. Biological materials can also be disposed of more easily without pollution of the environment.

For the system according to the invention, it is of central importance that at the joint between a bar-element and a connecting element or a further bar-element, each of both bodies exhibits at least in a selected area a surface which runs along the surface generated by a cylinder, cone, prism or a pyramid, as well as at least in another selected area a surface which runs along a hollow cylinder, hollow cone, hollow prism and/or a hollow pyramid respectively. On the one hand, these are bodies which can be produced with relatively simple processes like milling or lathing. On the other hand, this enables a connection by plugging with closely adjoining surfaces, which are suitable for a locking by clamping and/or glueing. By utilization of a press fit an even higher strength of the bonding is achievable. For instance, at a bar-element a convex hollow element (inside) is always present within a concave solid element (outside), so that two standardized surfaces lying in each other can be created easily by processing the inner and the outer side. If two surfaces, which are approximately complementary, are created at the connection-element, whereby the convex hollow element is located outside of the concave solid element (core), then the potential bonding area and therefore the strength of the joint can be approximately doubled. Furthermore, a bar-element inserted into the recess is completely covered at its face side, and therefore is always firmly pressed to both bonding areas even during different expansions, e.g. caused by moisture (swelling).

The invention recommends that the two different geometrical shapes, along which the surface of a body runs, are aligned concentrically to each other. Such an arrangement of special homogeneity can be produced in a very simple way, and, for instance, it comes closest to the natural geometry of a bamboo culm.

If the two different, but somehow symmetric shapes, along which the surface of the body runs, exhibit constant distances from each other, then the result is an isotropic structure, which permits an arbitrary rotation of the bamboo culm around its axis, and therefore offers an additional degree of freedom to enable a fine adjustment at difficult nodes of the truss.

At the connection-elements, a plurality of recesses exist, one for each connected bar-element. Each recess has an annular shape and is machined into a continuous surface, so that each recess surrounds a core. This core ends in a front side which is flush with the area surrounding the recess. In this context, flush means lying in a common surface, especially in a common even or flat plane or in a common surface of the same (constant) curvature.

An important aspect of the invention is that the depth of the recess, as measured at its outside periphery against the surrounding area of the connection element, is equal to the maximum height of the core within the recess, as measured from the bottom of the recess to the most protruding area of the core inside the recess.

Another feature of the invention is that the cross-section of the recess is symmetrical to a line between both boundaries of the recess. According to the present invention, there is a full symmetry of the cross-section from the area surrounding the recess at its outside to the core inside the recess, resulting in two pairs of closely adjoining surfaces, which are glued together in pairs.

The outer lateral surfaces adjoining each other have identical surface areas $$F_o = p_o * h = 2\pi R * h,$$

where $p_o$ is the perimeter of the radial outer boundary of the recess, h is the depth of the recess; in case of a cylindrical surface, R is the radius of the outer cylindrical boundary surface.

The inner lateral surfaces adjoining each other have identical surface areas:

$$F_i = p_i * h = 2\pi r * h,$$

where $p_i$ is the perimeter of the radial inner boundary of the recess, h is the height of the core or the depth of the recess; in case of a cylindrical surface, r is the radius of the inner cylindrical boundary surface.

The whole surface F glued together is:

$$F = F_o + F_i = 2\pi(R+r) * h$$

As the difference between $F_o$ and $F_i$ is equal to the cross-section of the recess, multiplied by $2\pi$:

$$F_o - F_i = 2\pi(R-r) * h = 2\pi[R-(R-d)] * h = 2\pi d * h,$$

where d is the width of the recess, this difference can be ignored, and then the whole surface F glued together is nearly $$F = 2 * F_o = 4\pi R * h.$$

For a maximum efficiency and strength of the adhesive connection, the complete lateral surface of the core inside the recess should be in close contact to the plugged-in bar-element, without any clearance or distance therebetween in any area of the lateral core surface, from the core's bottom up to its tip or front end.

Furthermore, for the purpose of producing a strong truss, the connecting elements should be made massive, that is without inner cavities.

The joint of a bar-element with a connection-element is constructed as a plug-connection, whereby both elements are glued together. Clamping joints can support adhesive joints, for instance with the help of wood glue, as locking means. Additionally to the positive locking of the plugging connection, threaded sleeves and/or screwing bolts can be arranged to transmit forces acting along the longitudinal direction of the plugging connection (partially) via a screwed joint.

For clamping a bar-element at a connection-element or at an additional bar-element, a core, which is integrated there and designed for engagement with the bar-element, can be spreaded and thereby pressed from the inside against the inner side of the bar-element. To spread the core a continually widening element, e.g. of the shape of a cone or of a frustum of a pyramid, can be pushed or pulled into an inner, preferably centric recess of the spreadable core. Thereby, this element transforms an actuating force of axial direction into a radial deformation of a spreadable core. For this purpose, connection-element can have a cut-out running through its core, into which the shaft of a screw, a threaded bolt or the like is insertable. The latter derives its axial force from a self-locking twist with regard to another threaded element, which thereby receives the counter-force appearing during the pulling of an element with a widening cross-section into the core.

If a connecting element is in the shape of a ring, then not only bar-elements directed to said connecting element from arbitrary directions within the base plane of the ring can be accommodated and securely anchored. Moreover, it is possible to prolong the recesses for accommodation of a screw-like spreading element each as far as to the inner side of the ring, in order to be able to apply a threaded element or another clamping element there, which in turn can be comfortably actuated after the concerned connections have been made. However, preferably the longitudinal axes of all connected bar-elements are directed towards a central point of the connection-element, so that no torque appears in the truss which could lead to flexural stress of the bar-elements.

Preferably, a connection-element has a discoid shape, for instance with a circular or triangular, quadrilateral or hexagonal base. Such a connection-element is especially suitable for planar trusses, as all connections lie within one plane there. If, for instance, a crossbar to a parallel planar truss is to be made, then it is advisable to design these connections not to be perpendicular to a planar truss. The slanted anchoring structures required for this can be accommodated at a variety of locations at a discoid connection-element, but also at a further connection-element affixed to it. The thickness of such a discoid connection-element should be greater than the maximum diameter of a bar-element, so that its ending region is completely embedded into the connection-element. Thereby, if for instance bamboo is used for the bar-elements, the more sensitive inner side of the bamboo culm is not accessible from outside.

Next to the described embodiment of a connection-element made as one piece, it could also be made from two pieces, so that the two halves initially separated from one another can be put around a continuous bar-element in order to completely surround it after joining, and, for instance, to anchor a further bar-element at a place of a truss where previously no node was present. In this way such a "half" connection-element can also be fixed to the shaft of a bar-element, e.g. with adhesives. For this purpose, such connection-element comprises a concave connecting surface which encloses the concerned bar-element partially. In order to produce such a bonding joint, the concerned area of the shaft of a bar-element should be machined at its outer side, too, especially milled to a round shape.

It is in the scope of the invention that a bar-element can be inserted between two connection-elements, or between two other bar-elements in order to prolong these in coaxial direction. While in the first case both ends of the bar-element should exhibit the same plug-connection-structure (e.g. annular tongue-annular tongue), it is advisable in the latter case that principally complementary plug-connection-structures are designated at both ends (e.g. annular tongue-annular groove), so that the result are normed bar-elements matching to each other.

Moreover, the invention suggests the utilization of stems, stalks or shanks of high-growing plants, which can be easily processed to elongated elements for trusses. Besides the Dicotyledones prevalent in Europe, especially the deciduous and coniferous trees, where thin trunks with a diameter up to approximately 10 or 15 cm (so-called weak-wood) are especially suitable, also plants of the species of the Monocotyledones (palm trees, grasses, etc.) can be used, as the vascular bundles of said Monocotyledones are spread so irregularly that no xylem rays appear. As a result the fibres are not arranged in a regular pattern side by side. As all fibres run parallel to each other, a configuration for instance in isogonal rows or even in one single ring would lead to layers of bonding agent which are not reinforced, along which a peeling-off, i.e. the formation of cracks would be considerably facilitated. Therefore, such fibreless central or xylem rays should be avoided where possible. Further, an increase of the density of the fibres is desirable from the center to the outer circumference of the bar-element, where naturally the highest forces appear in the case of still appearing flexural stress. Following this idea of the invention, among the family of the Gramineae one will find the so-called giant grasses or bamboo plants, which have the further advantage of an increase of vascular bundles or vascular fibres at the outer circumference and therefore feature a high flexural strength despite of fibres running in longitudinal direction. Certainly, the stems or stalks of bamboo plants are divided in their longitudinal direction into nodes (node levels) and into internodes (tube-like areas). The cross-linking of the fibres at the nodes shall increase the elasticity of the living bamboo; however, in harvested and dried bamboo those can cause tensions, and therefore they should be pierced. An excessive impairment of the stability of such bamboo culm is not to be expected therefrom. As the internode-segments have a structure of extreme homogeneity and as the nodes as centres of growth constitute only thin layers, the properties of the tubes are dominated by the segments, i.e. the internodes. Merely the tensile strength is decreased in the nodes, but not compressive, shear and flexural strength, so that the stability of a truss which is predominately subjected to compressive forces does not suffer from this.

Some bamboo plants grow within one year to a height of up to 30 meters, while in the following years only a lignification without additional growth occurs. With the high-growing bamboo-plants the diameter of the trunk is between 5 and 20 centimeters, and the wall-thickness of the tube is approximately between 0.5 and 8.0 centimeters. With the exception of the regularly appearing nodes, Bamboo has no defects like they are found at Dicotyledones, for instance in the form of starting points of branches (so-called knotholes), and which additionally impair the stability. Due to its high mechanical strength, a bamboo culm can absorb high tensile and/or compressive forces in longitudinal direction, which are comparable to those of steel in the area of the internodes. The flexural stress is only limited by a tendency towards the creation of bucklings when high flexural forces are applied. Although bamboo plants are growing slightly more straight than most types of trees, almost always inestimable curvatures are present as well as considerable irregularities regarding the diameter of the tube. For this reason, until now bamboo culms were always bound together with strings, fibres or the like, which again is absolutely insufficient for the production of a framework or truss, as with this no forces in longitudinal direction of the involved bamboo culms can be transmitted.

As the outside of the stem is covered by a hard, water-repellent and extremely lasting layer, which contains silicates, while the inside bears a wax-like coating, these areas cannot be wetted by many adhesives and therefore would impair the durability of a bonded joint. Furthermore, as these layers are relatively smooth, the achievable frictional connection is relatively low, and so the invention suggests to ablate these layers, but only at an area which is not subjected to the atmosphere so that no water can enter at the areas which are not protected against moisture anymore.

The shape of the bar-elements themselves may be manifold. According to the chosen material a bar-like structure, i.e. with a massive core like it results for instance from deciduous or coniferous wood, can be preferred, or a tube-like structure, which presents itself when using bamboo culms. Furthermore, core drilling of solid log wood bars has the advantage of a steady drying across the diameter with consequently steady and therefore crack-free shrinking.

A further aspect is that bamboo is a biological material, which shrinks or swells under the influence of its environmental conditions and therefore tends to develop cracks in the course of time, for example when a rigid end-piece, for instance made from metal or plastic, is inserted. This in turn would have disastrous consequences, as afterwards the water-repellent surface would be interrupted and after that water could enter and cause rottenness or the like. For this reason, the invention prefers the use of connection-elements of a comparable biological material like for instance Dicotyledones, especially deciduous or coniferous wood. Those exhibit similar reactions to changed environmental conditions as Monocotyledones and therefore can shrink or swell in the same fashion, so that the inner tensions in the material remain comparably low. However, to insure this any intermediate pieces between the Monocotyledone tubes and the connection-elements have to be avoided as possible. Therefore, the invention provides a direct joint, either as a plugging, clamping and/or a bonding joint. On the other hand, such joining technique which is industrially applicable with justifiable effort requires standardized contact surfaces, which are not offered by a naturally grown giant grass. This is remedied by the invention in that initially the irregular ends of a bamboo culm which is to be used are treated in such a way that surfaces running along well-defined geometric bodies are created. This work step can be integrated with the aforementioned ablating of the outward surface layers in the proximity of the joining area.

As mentioned before, for the sake of optimal compatibility of a connection-element with a bar-element the former can consist of wood. Although wood and bamboo both are organic materials, they have fundamental differences. Therefore also panelling material made of multi-layer glued bamboo can be used if necessary, so that the material properties are identical to that of the bamboo culms.

As the joint element is connected for instance by a sealing adhesive with a tube-like bar-element, for instance a bamboo tube, and features internally connected channels which lead to the cavities of the connected, tube-like bar-elements, whereby in the case of bamboo tubes their nodes are drilled, so a closed cavity with an intentionally influenced sub-climate is created within a framework or truss produced in such way. This sub-climate can be influenced in a multitude of ways in order to control and/or monitor the behaviour of the truss, or to keep potentially destroying influences like infestation of pests from the inside, fire or the like away from the truss. For this it has proven pertinent if at least one joint element and/or tube-like bar-element comprises a port at which gases, foams and/or liquids can be fed into the cavity of the system, for example moist or dry air to keep the bamboo flexible through a controlled climate, further toxins as well as hot, cold or compressed air for pest control, fire extinguishing agents like for instance nitrogen, foams or water or the like.

To solve the set problem, a generic manufacturing process is embodied according to the characterizing part of the co-ordinated process claim. In the claims subordinated to that further, preferred features of the process according to the present invention are described.

The requirement of standardized surface areas which is at first not fulfilled with naturally grown materials, for instance wood or bamboo culms, is indispensable for their employment in the scope of the production of a truss, so that the individual parts fit exactly to each other and are pluggable in the desired way. Furthermore it is of great benefit if also the alignment of the standardized end areas relative to each other is exactly specified. Especially favourable conditions are created if the end areas are machined in such a way that the geometric bodies defining their surfaces at least in selected areas exhibit at least one axis of symmetry each which can be arranged in mutual relation, for instance to share a common alignment. Only through this it becomes possible to comply with precisely specified angles of inclination of bar-elements in order to bring them together at predetermined nodes of the truss. These requirements enable the production of trusses according to plan which are calculated in advance with regard to their statics, what is the more important the bigger a building is. Again, the possibility of the use of (wooden) bars and/or (bamboo) tubes of variable length is not impaired, as the machining of the ends can take place at the construction site after a (tube-like as applicable) bar-element was cut to the desired length. Further, at least one lateral surface area has to be created at a connection-element, which permits the plugging with a lateral surface of the end of a bar-element. The diameter of this lateral surface and therefore the selection of the tool required for its creation is determined by the classification, if applicable, of the end of the concerned wooden bar or bamboo tube. As this is determined usually only directly preceding to the mounting of the concerned bar-element, the suitable plug-structure is formed at the concerned connection-element only on the site.

Preferably the bodies and/or surfaces of the parts which have to be joined are machined by ablating, especially by cutting. This technology is equally suitable for bamboo and wood. The tools required for this are handy and therefore they can comfortably be carried along at a construction side. For this reason, the machining or rework of already assembled connection-elements is possible, for instance by means of hand drilling- or hand milling-machines. Bar-elements like wooden bars or bamboo tubes are machined before assembly, but after appropriately cutting them to length. Therefor, a clamping apparatus is required.

In order to allow (selected areas of) a lateral surface of a connection structure, especially a core, of connecting elements (but also of bar-elements which are to be directly joined), which are designated for (detachable) clamping joints, a spring like movement, slots which are preferably parallel to the longitudinal axis of the concerned plugging connection can be formed in areas close to said lateral surface. These slots can also be designated already in a factory. As a part of the connection-element has to be removed anyway during the (later) preparing of a ring-shaped recess as a connection structure, an exact radial extension of the slots is not required; those just have to be sized in such a way that they always reach the concerned lateral surface.

Previous to the mounting of a bar-element, at such clamping joint first a spreading element has to be inserted into a bore directed in parallel or in coaxial alignment to the longitudinal axis of the connection-element, which can be used after the assembly to exert (radial) pressure to (selected areas of) the concerned lateral surface in direction of the lateral surface at the end of a bar-element which is to be connected.

After that the bar-elements are plugged together with the concerned connection- or bar-elements and glued or clamped to each other. Naturally, these work steps are executed partly in parallel, as almost every nodal connection-element is on the one hand supported by bar-elements, on the other hand it is bearing further bar-elements, so that some connections are formed sooner, others later.

Along the longitudinal edges of a truss or framework, connection-elements are used as end pieces, which are attachable to a foundation, a ceiling, a roof or the like. These are equipped with a preferably planar base surface having an anchoring facility, for instance one or more bore(s) for passing through mounting screws.

A panelling or the like can be attached to the joints of a truss to obtain a wall-like structure, like it is required for example for the construction of houses. While a corresponding anchoring takes place exclusively at the connection-elements, but not at the bar-elements, the latter remain uninjured and therefore conserve their water-repellent properties of their outer surface where applicable, and a cavity contained inside the truss remains sealed. If relatively delicate panellings, for instance plasterboards, have to be fixed to the truss, then either the distances of the nodes can be reduced, or first a sub-batten is fixed to those, onto which the concerned panelling can be mounted at short intervals.

The inner and/or outer lateral surface at the end parts of a tubular bar-element, especially of a bamboo tube, can be machined. The machining of one lateral surface each, for instance of the outer, may suffice for smaller trusses, while for highly stressable trusses both lateral surfaces at each end of a bamboo tube each should be machined, in order to optimize the stability of each individual connection by an increase of the potential bonding surface and by an additional positive lock in both radial directions (inside and outside).

By doing so, it has to be taken into account that the radius varies with lumbers or bamboo tubes, additionally, with bamboo tubes or core-drilled lumbers even the wall thickness varies. For instance, considering a 30 m high bamboo tube, the outer diameter decreases from bottom to top, but especially the wall thickness, too. Due to this reduction of the wall-thickness, usually only the lower 10 m of a bamboo tube can be used for the purpose of the present invention. If, for example, this section is sawn into single parts with a length of 1.5 m each, then each short bamboo-tube still has different wall-thicknesses and eventually different outer diameters. As the case may be, these deviations can be so significant, that the outer diameter of a cut bamboo tube is smaller than the inner diameter of another bamboo tube. Therefore, a common machining with identical tools is out of question. For this purpose, the invention suggests to create different classes for (the ends of) pieces of bamboo tubes with regard to their wall thickness and/or regarding their inner and outer diameter or circumference. In doing so, the (minimum) inner diameter as well as the (maximum) outer diameter can easily be determined with one gauge each. Such gauges can have the shape of a cylinder or of a flat rectangle (for the inside) or the shape of a hollow cylinder or of a fork (for the outside). Of course, these dimensions can be measured in different ways also. Each (end of a) bamboo tube is sorted into a more or less finely graded system of classification, according to which the selection of the further treatment tool(s) is decided. Thereby, the invention recommends that the lateral surface(s) of the end of a bamboo tube are machined in such a way, that the wall-thickness of the bamboo-tube is equal to or smaller than a wall-thickness previously selected (according to the system of classification).

Before mounting a bamboo tube, eventually present diaphragms should be bored or made passable otherwise in order to create a cavity within the finished truss which is usable for a variety of purposes. To obtain a connection of the cavities of the bamboo tubes which are connected to one connection-element, drillings have to be made, which join inside of the connection-element and which lead to the surface areas of the connection-element covered by a face side of a connected bamboo tube. On the other hand, if required, the complete cavity of a truss can be divided into multiple sections, which can be influenced independently from each other, by using special connection-elements without such continuous channels. Moreover, the boring is intended to provide a homogeneous shrinking of the bamboo tube during the seasoning after the harvesting, and therefore to prevent tensions and therewith cracks in the bamboo.

On the other hand, the diameter of internal channels connecting cavities is entirely independent from the diameter of a wood or bamboo tube which is to be connected. Provided that it is known from the completed design data under which inclination angles tubular bar-elements meet with a connection-element, the necessary connecting channels can be created during the manufacturing of the connecting elements and thus before their mounting. For this purpose, the raw connection-element can be exactly clamped, so that the drillings placed from different sides in fact do meet in the centre. For this, preferably a mobile machining centre with guides of aluminium profiles and multi-axled servo drives is used, which works according to the specifications of a design software. The like drillings for the connection of cavities can serve as tool-guidings at the construction site during the creation of the concerned lateral surface(s) for the connection of one bar-element each. At connecting elements without cavity-connecting channels, drillings may be provided during their production, which are specially intended for the purpose of acting as a tool-guiding.

If at least one tubular bar-element, especially bamboo tube, and/or preferably at least one connection-element is provided with a port to the cavity within the tubular bar-elements and connection-elements, different media can be conducted into this cavity as necessary. In order to permit an exhaustion of a medium which is already contained within the cavity, for instance air, it is advisable to always designate at least two such ports at a cavity closed apart from that. Those should be arranged at distant places to create defined flow conditions. Thereby, it has proven beneficial to arrange one such port at the lowest position and as necessary another port at the highest position of a section of a truss, so that on the one hand liquids, and on the other hand gases each can be completely removed from the cavity.

An apparatus for carrying out the process according to the present invention is described by the characterising features of the independent apparatus claim.

The utilization of such an apparatus simplifies the production of a truss insofar, as thereby a time-consuming, manual individual treatment respectively rework of the different nodes of the truss can be omitted because surface areas which are compatible to each other are created. As a machining apparatus according to the present invention is configured as an ablating tool, especially as a cutting tool, it can be configured to be mobile due to its small required space, and therefore it can be transported to the construction site without problems.

An apparatus for machining of the ends of a bar-element is characterised by a device for clamping a bar-element in such a way, that both of its ends are as concentrically as possible aligned to a longitudinal axis of the machining apparatus. Thus, the actual machining-tools always come across a bar-element which is to be processed at one and the same predetermined position, so that they can be adjusted with regard to the body of the machine in a defined way. Thereby, in general a holding and/or fixing device for each treatment tool is placed at each end of the clamping device. Such a fixing device can, for example, be configured as a slide, which is moveable in a defined way through a guide in the feeding direction along the longitudinal axis of the machining apparatus, and which on the other hand is carrying the actual holding and/or mounting for the machining tool and/or its drive motor.

A cutting tool, for example in the form of a milling head, which is configured for the simultaneously processing of the inner and outer lateral surfaces of the ends of a bar-element, in particular of a bamboo tube, serves for the processing of the lateral surfaces at the ends and, for this purpose, is equipped with two separate machining areas, in particular cutting areas. The actual cutting areas can be detachably and thus exchangeably fixed to a base body of the tool, or they can be adjustable with regard to it so that the tool can be adapted to differently classified ends of bamboo tubes.

A preferred apparatus for the machining of a connection-element is characterised by a tool rotating around at least one axis with at least one cutting area for the creation of a rotational symmetric recess of defined cross section. Preferably, the tool can be configured to be clampable into a hand drilling machine or the like, in order to be utilizable also for nodal connection-elements which are already mounted in the truss. With a different configuration, the bar-element, in particular a bamboo tube, can rotate, and the tool can be fixed in such a way that it only performs feed motion similar to the function of a classical lathe machine.

According to a further aspect of the invention, the cutting area is arranged at a peripheral lateral surface area of the base body of the tool, which encircles a central guiding device, for example a forward protruding pin. By means of such a guiding device, the tool can be centred at a predrilled hole, for instance at a cylindrical guiding recess, in order to assure that the bar-element which is to be inserted exactly takes up a specified inclination angle, and thus its opposed end is precisely insertable into the nodal connection-element there.

Finally, according to the teaching of the invention, the central guiding device is configured as a drill, so that the guiding drill hole and the guiding recess can be produced in one work step. This embodiment is in particular intended for nodes of the truss which have not been calculated in advance and where no guiding drill holes can be produced at the connection-elements in the factory. In those cases the direction of the plugging connection which receives a bar-element can be adjusted by an assembly mechanic on his own; however, he has to work very carefully in order to find a central cavity-channel and to exactly determine the right orientation of the bar-element.

BRIEF DESCRIPTION OF THE SEVERAL VIEWS OF THE DRAWING

Further features, details, advantages and effects on the basis of the invention result from the following description of preferred embodiments of the invention as well as from the drawing. There.

DETAILED DESCRIPTION OF THE INVENTION

Figures 1, 2, 3:
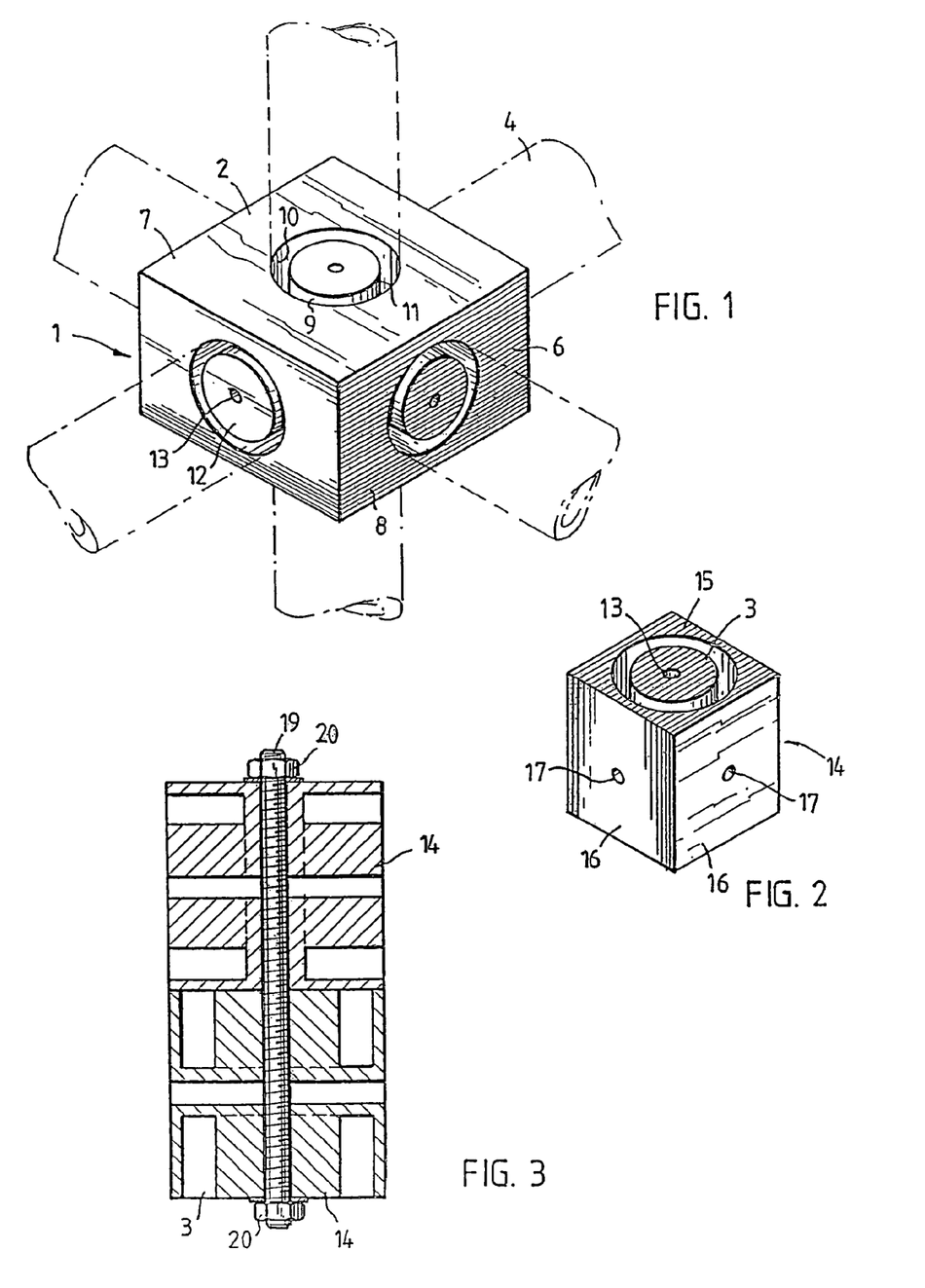
FIG. 1 shows a perspective view of the first connection-element of a truss-system according to the present invention.
FIG. 2 shows a modified embodiment of a connection-element in an illustration corresponding to FIG. 1.
FIG. 3 is a section through two connection-elements according to FIG. 2 fixed to each other.

The perspective view of a connecting element 1 in FIG. 1 is intended to illustrate the basic principle of the present invention. An arbitrarily or randomly shaped connection-element 1 exhibits at its surface 2 one or more three-dimensional structures 3 for the connection of one bamboo tube 4 each. By assembly of multiple bamboo tubes 4 at such a connection-element 1, the latter becomes a node in a truss or framework 5.

The connection-element 1 from FIG. 1 has the basic shape of a rectangular parallelepiped with four equally sized lateral faces 6 and one square top and bottom side 7 each. The epipedal-shaped connection-element 1 consists of many layers of plywood 8 glued on top of each other with crossed direction of fibres each. As these glued layers of plywood 8 run parallel to the square top or bottom side 7, the connection-element 1 has a high tensile strength in directions running parallel to those planes.

A structure 3 for the connection of one bamboo tube 4 each is arranged at all six faces 6, 7 of the connection-element 1, so that six bamboo tubes 4 can be brought together at such node of the truss, of which two each are aligned with each other and are standing perpendicularly to the plane spanned by the remaining four bamboo tubes 4. Thus a three-dimensional truss is feasible.

As is further shown in FIG. 1, each structure 3 for the mounting of a bamboo tube 4 has approximately the shape of an annular recess 9 with two bounding surfaces 10, 11 in the shape of lateral surfaces of cylinders which are concentrical to each other. The outer diameter of this recess 9 corresponds approximately to the outer diameter of the concerned bamboo tube 4, and the constant distance of the bounding surfaces 10, 11 with the shape of lateral surfaces of cylinders corresponds approximately to the standardized maximal thickness of an end area of a bamboo tube 4 which is insertable into this recess.

With the embodiment according to FIG. 1, the ends of the bamboo tubes 4 are glued into the annular recesses of the connection-element 1, so that a rigid and non-detachable connection is obtained. As FIG. 1 further shows, a cylindrical core 12 remains within each annular recess 9, which is adhesively connected to the inside of a bamboo tube 4 and thus additionally fixes and stabilizes this bamboo tube 4. As wood exhibits comparable temperature coefficients and swelling phenomena due to moisture as bamboo, a formation of cracks is thus effectively prevented.

Further, each of the cylindrical cores 12 is penetrated by a drilling 13 in its longitudinal direction. All of these drillings 13 join within the connection-element 1 and thus create a system of connecting channels between the cavities of all connected bamboo tubes 4.

If—as the invention further provides—all diaphragms of the bamboo tubes 4 are pierced, these cavities are connected with the connection-elements 1 present across the bamboo tubes 4 and in this way also with all other cavities of suchlike produced truss or framework 5. As otherwise the cavities within the bamboo tubes 4 are hermetically sealed by their air-tight outer surface, a purposefully influenceable sub-climate is obtained in the connected cavities of a truss or framework 5 according to the present invention.

For instance, toxins, hot or cold air or other agents for pest control can be conducted into this cavity to prevent an infestation of pests of such a truss or framework 5, without the utilized agent for pest control ever coming in contact with the outer environment. Therefore, the system according to the present invention has the advantage that the agents are always highly efficient in the smallest doses, regardless of their composition, without ever affecting the environment. For a similar purpose heavy temporal fluctuations of pressure can be created.

Furthermore, this cavity can be filled with a non-flammable gas, for example nitrogen, under positive pressure, so that in the case of a fire a significant amount of nitrogen is released at the source of the fire in order to extinguish the burning. At the same time the sudden decrease of pressure caused by this can be measured in order to thus infer a fire and to be able to make provisions against a further spreading of the fire by conducting water into the cavity. As soon as the fire is extinguished the water can be drained again, and the inner cavity of the truss or framework 5 can be dried again by conducting hot air.

The connection-element 14 from FIG. 2 has a cubical shape and is modified insofar, as there a structure 3 for connecting a bamboo tube 4 each is provided only at the top and bottom side 15, while at the lateral faces 16 only central drillings 17 are provided which penetrate the connection-element 14. This connection-element 14 also consists of layers of plywood 18 glued to each other, which are running perpendicular to the top or bottom side 15.

The connection-element 14 serves mainly for the extension of bamboo tubes 4. In order to also realise nodes of a truss with this, two or more such connection-elements 14 are fixed to each other as shown in FIG. 3. For this purpose, the connection-elements are put together in the desired orientation in such a way that one drilling 17 each is aligned with the other. A screw or threaded bolt 19 is inserted in the two aligned drillings and is locked at both sides with a threaded element 20, so that the connection-elements 14 are fixed to each other.

Now bamboo tubes 4 can be inserted into the accessible connection structures 3 and glued there in the desired manner. This arrangement has the further speciality, that at such node of a truss a rotation is possible for adaptation to framework structures running in slanted directions with regard to each other.

At the connection-element 1, the bamboo tubes 4 agglutinated to the structures 3 at the top and bottom sides are only glued to a part of the layers of plywood 8 each, so that for instance the concerned core 12 and thus the whole bamboo tube 4 could be torn out when exposed to high tensile forces. This can be prevented by fixing a connection-element 14 each at the top and/or bottom side 7 of a connection-element 1 as required, for instance by means of an inserted and locked threaded bolt 19. Thereby, the connection-elements 14 can be aligned in such a way, that their agglutinated layers of plywood 8 are running perpendicular to the top and bottom side 7 of the connection-element 1 and therefore almost all layers are glued to the concerned bamboo tube 4.

Figures 4, 5, 6, 7:
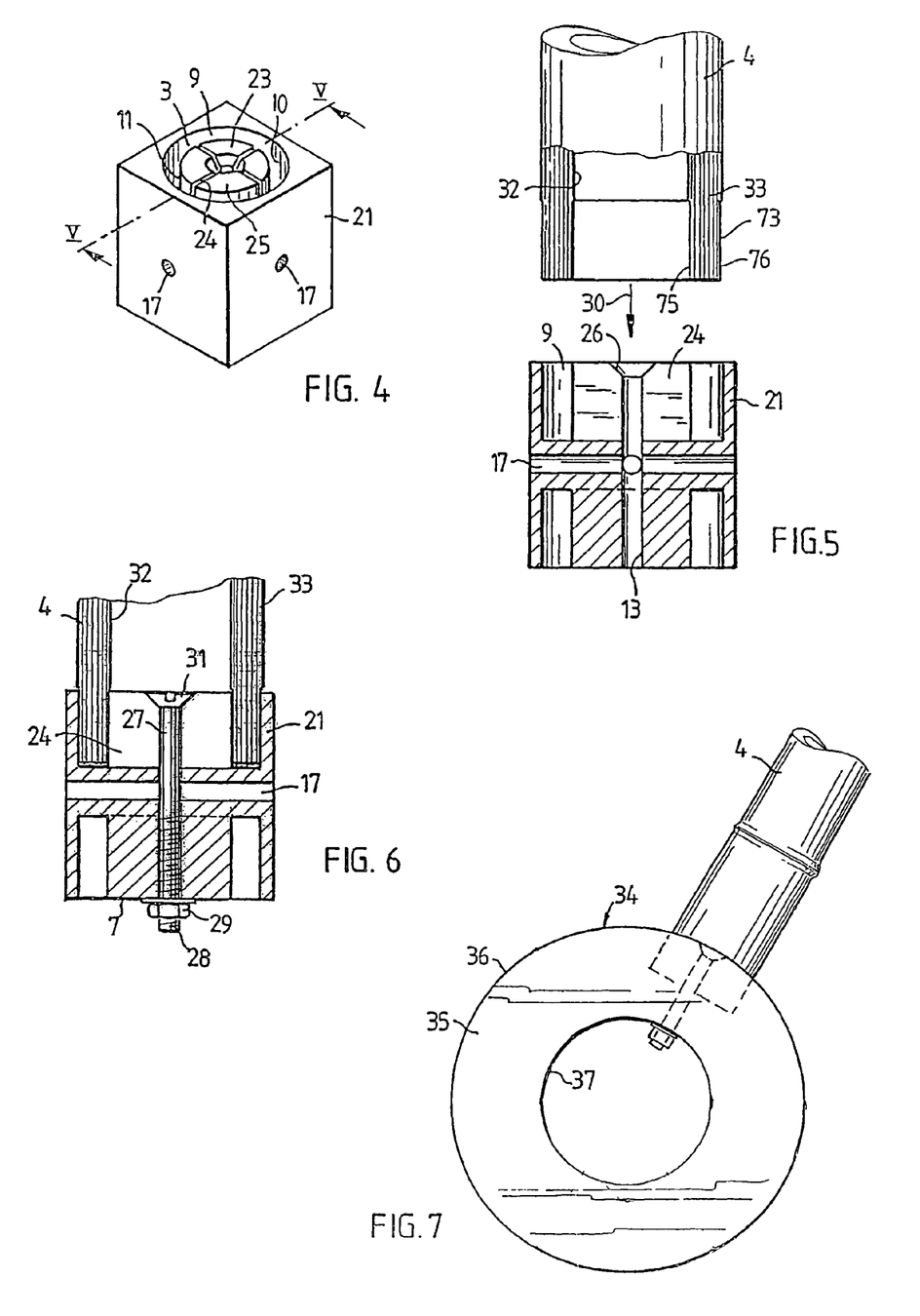
FIG. 4 shows a modification of the connection-element from FIG. 2 in a perspective view.
FIG. 5 is an exploded view of a pluggable connection with the connection-element from FIG. 4 as well as a partly cut and broken bamboo tube.
FIG. 6 shows the composition from FIG. 5 after assembly of the connection.
FIG. 7 shows a different configuration of the invention.

The connection-element 21 from FIG. 4 has the same cubical shape as the connection-element 14. As with this, the three-dimensional structure 22 for the connection of a bamboo tube 4 also comprises an annular recess 9 with two bounding surfaces 10, 11 which are concentrical to each other. The core 23 remaining within this recess is penetrated by a central drilling 13. However, contrary to the connection-element 14, the core 23 is provided with two slittings 24 along the longitudinal axis of the drilling 13, which extend approximately to the base of the core 23 respectively of the annular recess 9, so that the remaining quarters 25 of the core can spring to the outside in a limited way.

The central drilling 13 in the core 23 exhibits a conical countersinking 26, in which the head of a countersunk screw 27 with a machine thread 28 inserted into the drilling can be positioned. A threaded element 29 is screwed on this thread 28 at the outer surface 7 of the connection-element 21 opposite to the connection unit 22. After the insertion 30 of a bamboo tube 4 into the annular recess 9 this threaded element 29 is firmly secured. Thereby the head of the screw 31 is pushed deeper and deeper into the conical countersinking 26 and thereby spreads the quarters 25 of the core to the outside. Those in turn are pressed with their outsides 11 against the inner side 32 of the lateral surface 33 of a bamboo tube 4, clamping it tightly. Therefore, the gluing of a bamboo tube 4 is not required with this type of connection 21, and the connection can always be detached in a non-destructive way. Instead of a countersunk screw 27, a conical bolt or the like can be used, too.

A further connection-element 34 is shown in FIG. 7. This has the shape of an annulus with rectangular or square cross-section. At the outer surface 36 of this ring 35 six three-dimensional structures 22 are located equidistantly distributed over the circumference for the connection of one bamboo tube 4 each. The three-dimensional connection structures 22 are identical to the concerned structures 22 of the connection-element 21 regarding their topology and function, so that a cross section through the ring 35 at a connection point 21 rather corresponds to FIG. 6, with the exception of the fact that here the crossways running drilling 17 as well as a connection structure at the inner side 37 of the ring is missing.

The ring 35 offers the advantage, that an almost arbitrary number of connection points—only one up to six or possibly even more—can be provided as required, whereby all connections 21 can be implemented to be detachable.

Figure 8:
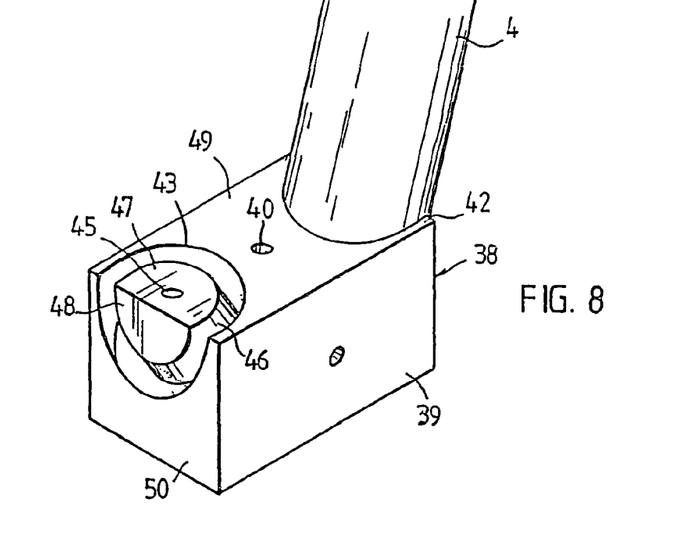
FIG. 8 shows a connection-element, which is for instance usable as a base element, in a perspective view.
Figure 9:
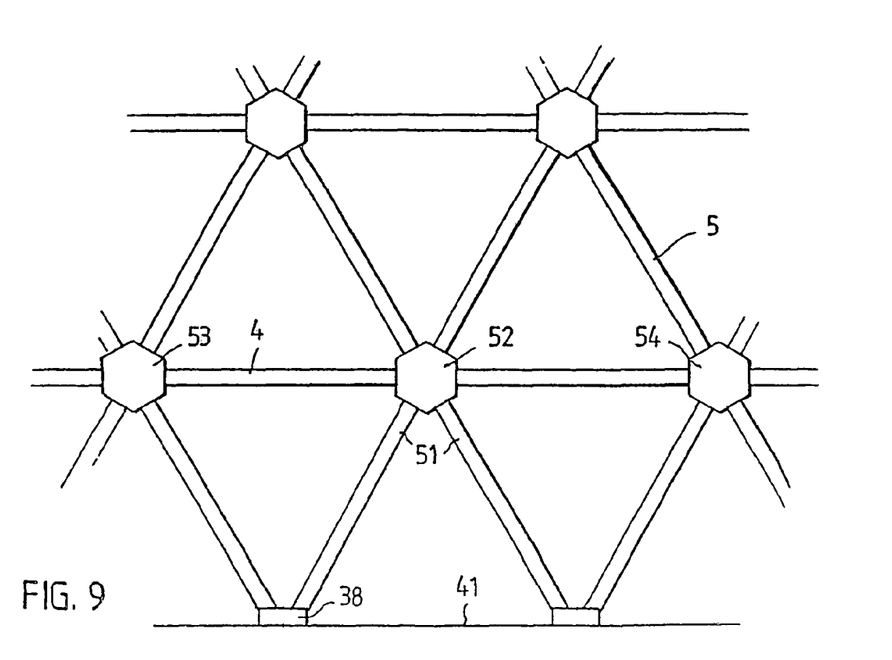
FIG. 9 is a side-view to a planar truss, built with the system according to the present invention.

With such a ring for instance planar trusses or frameworks 5 can be produced, like shown in FIG. 9. Thereby, connection-elements 38 of the kind illustrated in FIG. 8 serve as base elements. Those consist of one cuboid 39 each, whose length is approximately double than its height and width. They feature a central, continuous vertical drilling 40 for the fixing by screws to a foundation 41 or the like. At the area of their upper narrow edges 42 a three-dimensional structure 43 is provided each for the connection of a bamboo tube.

The structure 43 corresponds to the structure 3 of the embodiments 1 and 14 regarding its function, where a bamboo tube is not fixed by clamping, but by glueing. However, here the annular recess 44 and the drilling 45 concentrical to it are not located perpendicular to a surface of the connection-element 38, but inclined under an angle of 30° to the outside diverging from the vertical drilling 40 to the top. Moreover, the structure 43 overlaps the upper narrow edge 42, so that in particular the face side of the core 46 of the connection structure 43 is composed of two partial surfaces 47, 48 perpendicular to each other, which form a remaining part of the original surface 49, 50 of the connection-element 38. However, this fact does not impair the function of the three-dimensional structure 43 as a connecting and fixation point for a bamboo tube 4.

As shown in FIG. 9, initially a series of joint elements 38 is screwed or otherwise fixed to a foundation 41 in order to build a truss or framework 5. After the connecting structures 43 are brushed with glue, the ends of bamboo tubes 4 diverging from each other to the top at together 60° are inserted. Two bamboo tubes 4 are joined at their adjacent upper ends 51 by one nodal connection-element 52 each.

The connection-element 52 forming a node of the truss 5 has a similar base shape as the connection-element 1, however, unlike that it has a hexagonal base area with a constant thickness, which is greater than the maximum diameter of a bamboo tube 4. Like all other connection-elements 1, 14, 21, 34, 38, this also consists of layers of plywood crosswise laminated together, whose planes are parallel to the hexagonal base faces 53. Accordingly, the circumference 54 of such connection-element 52 consists of six equally sized rectangles.

Before the curing of the glue, adjoining nodal connection-elements 52 are connected by one bamboo tube 4 running in horizontal direction each, which is glued at the same time. Thus the first layer of the truss 5 is created. As soon as this is stiffened due to the curing of the glue, which can take approximately 15 minutes if wood glue is used, another layer of the truss can be put on it according to the same principle, as it is indicated at in FIG. 9. The completed truss 5 consists of many identical cells which have the shape of an equilateral triangle, and obtains thus optimal stability. Of course, another, also three-dimensional structure of a truss 5 can be chosen if required, for instance in the form of two planar and parallel trusses connected to each other or the like. Favourably the bamboo tubes 4 always have a length of only approximately 1 to 2 m, so that no buckling effects can appear due to a excessive flexural stress at a too long bamboo tube 4.

The node elements 52 can be individually finished on the spot at the construction site like all other connection-elements 1, 14, 21, 34, 38. For this purpose, initially base bodies 55 of the desired circumferential shape are cut out of a plate of preferably wood, in particular of moulded plywood, which can take place at a factory or sawmill as applicable. The required connecting structures 3, 22, 43 are then worked into these base bodies 55 on the spot, even in already mounted condition as required. A cutting tool 56, shown in FIGS. 10 and 11, serves for this purpose.

Figure 10:
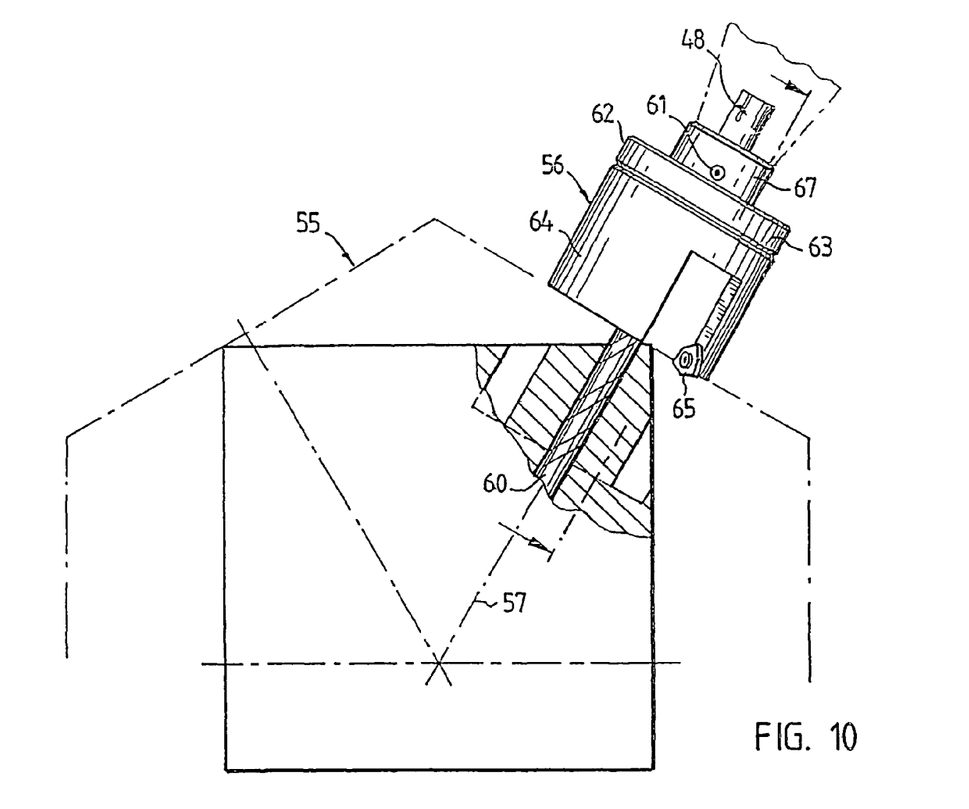
FIG. 10 shows a connection-element from the truss in FIG. 9 in broken and partly cut view, together with a tool applied at a lateral surface to create the cavity for receiving a bamboo tube.
Figure 11:
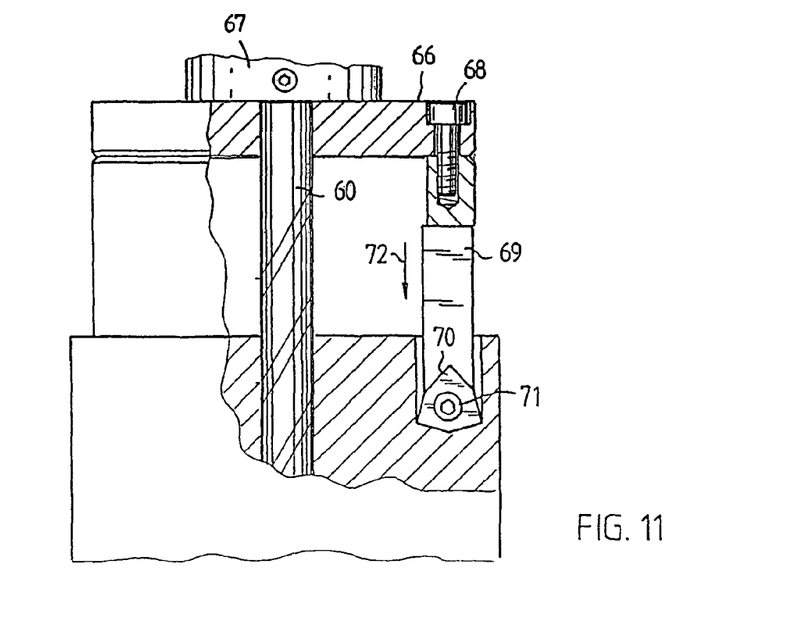
FIG. 11 is a longitudinal section through the tool from FIG. 10.

The cutting tool 56 comprises a rotating tool-head, which features a connection for a driving engine at the back. The connection can be embodied for instance as a cylindrical appendix 58 coaxial to the longitudinal axis of the tool 57, which is insertable into the chuck 59 of a hand drilling machine. With the illustrated embodiment this cylindrical mounting appendix 58 is a part of the shaft of a (wood) drill 60, with which the central cavities 13, 45 of a connecting structure 3, 22, 43 are drilled. An approximately bell-shaped tool-component 62 is detachably fixed at the shaft of this drill 60 by means of a clamping screw 61.

This bell-shaped tool-component 62 consists of a part 63 which is shaped like an annular disc, and a part 64, which is shaped like the lateral surface of a cylinder and extends from the periphery of the first part to the front, carrying at its front side the actual cutting tools 65 for the creation of the annular recess 9 of the connection structure 3, 22, 43. The part shaped like an annular disc has a inner diameter which corresponds to the diameter of the drill 60, and an outer diameter, which approximately corresponds to the outer diameter of a bar-element 4. At its backside 66 this part 63 is provided with an appendage 67 of reduced cross-section, but likewise cylindrical-shaped, through which a threaded hole with radial direction extends to accommodate the clamping screw 61. Thus the part 63 shaped like an annular disc can be plugged over the shaft of a drill 60, whereby it is aligned perpendicular to the longitudinal axis of the drill 57 by means of a fit almost free of play, in order to be locked in this position afterwards by tightening the clamping screw 61.

The part 64 shaped like the lateral surface of a cylinder can be integrally manufactured with the part shaped like an annular disc, for instance casted together with the latter, or, for example, it can be produced from a tubular part, which is screwed to the part 63 shaped like an annular disc from the backside 66 of this part with screws 68 parallel to the axis of the drill 57, as shown in FIG. 11. In the area of its front side the part 64 shaped like the lateral surface of a cylinder is furnished with a number of equidistantly distributed rectangular recesses, so that approximately the shape of a crown is obtained.

At multiple cutting areas 69 of the part 64 shaped like the lateral surface of a cylinder, which are parallel to the longitudinal axis of the tool 57, one cutting tip 70 each is fixed, preferable with a screw 71 passing through a central bore of the concerned cutting tip 70. As shown in FIG. 11, it is the object of this cutting tip 70 to cut the annular recess 9 into the body of a connection-element 1, 14, 21, 34, 38 during the rotation of the processing tool 56 as well as under the influence of a superimposed feeding motion 72. Thereby, the drill 60, whose front area is located before the cutting tip 70, can take over a guiding function.

With other embodiments of the invention, the recess of the connection structure can be bounded by bounding surfaces which are overall conical or bevelled at their base; for the production of such recesses the cutting tools have to feature an according geometry; if required, the cross-section of the part 64 shaped like the lateral surface of a cylinder has to be adapted.

As previously explained, the growth of a bar-element 4—especially a bamboo tube or a wooden rod—is always more or less irregular. As the annular recess 9 of a connection structure 3, 22, 43 according to the present invention is optimum round due to the use of a processing tool 56 revolving around an axis, normally a bar-element 4 cannot be inserted flush with it: Either the bamboo tube does not fit at all in the designated recess 9, or it is seated much too tight or—if the recess is dimensioned larger—too loose, so that no clamping effect is created respectively vast quantities of glue are required, which not only increases the costs, but also the labour time due to the increased curing times.

Figure 12:
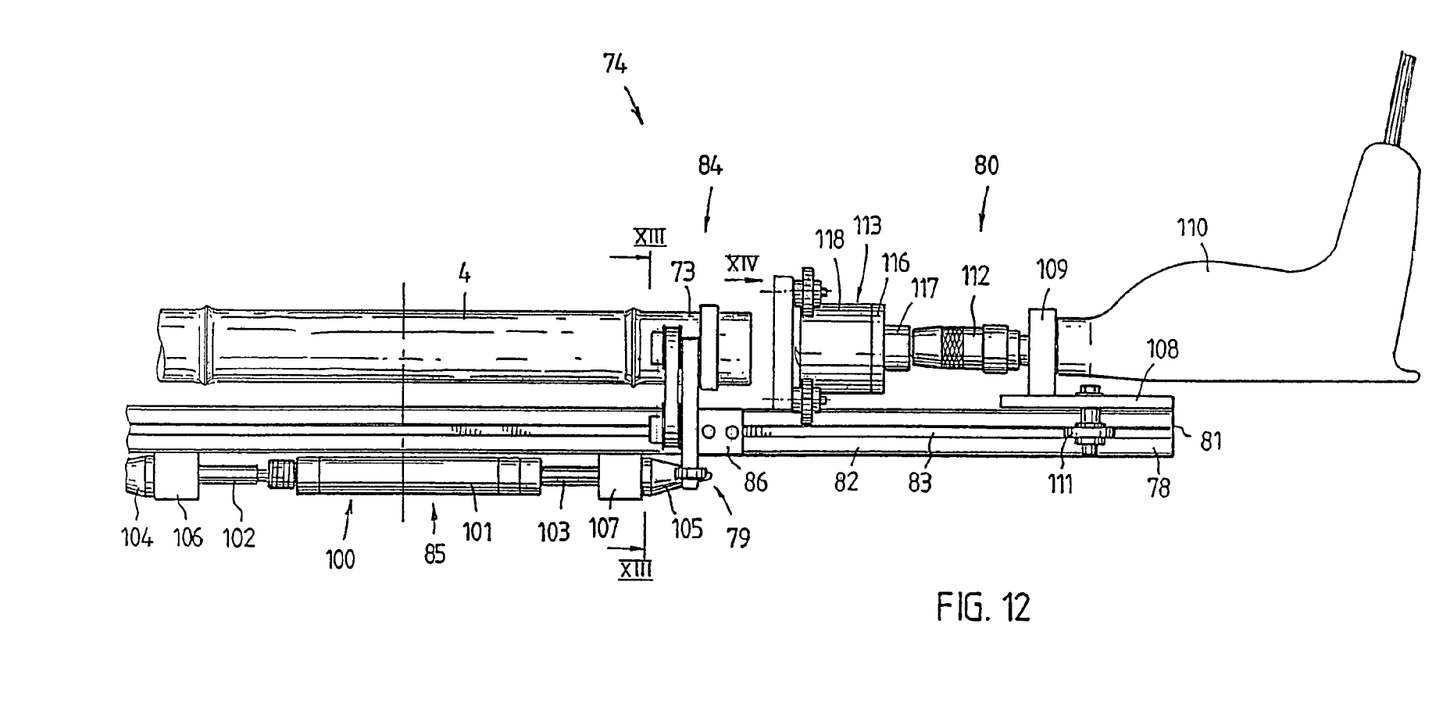
FIG. 12 is a broken side-view to an apparatus for clamping and processing the ends of a bamboo tube.

For this reason, the invention provides that the ends 73 of bar-elements 4, which have been cut to the desired length, are treated before they are mounted in a truss or framework 5. Therefore, a standardized geometry has to be applied to those, so is that they fit into the designated recesses 9 of the concerned connection-elements 1, 14, 21, 34, 38. However, in general this is not sufficient for the production of an exactly pre-planned truss 5, as often both ends 73 of a cut bar-element 4 are not coaxial to each other. This in turn would lead to displacements and/or tensions within a truss 5, which would gradually sum up themselves during the course of the construction, so that a bigger building would become more and more skewed with the progress of the construction. Therefore it is the additional object of an apparatus 74 for the machining of the ends 73 of a bar-element 4 to assure that not only the two end areas 73 of a bamboo tube 4 exhibit surfaces 75, 76 running along lateral surfaces of cylinders (with other types of connections for instance lateral surfaces of cones) in selected areas, but also that the longitudinal axes of those cylindrical (conical, etc.) areas of both ends 73 are aligned to each other in coaxial relation. An apparatus 74, which is capable of this, is shown in FIG. 12.

In the strict sense, only approximately half of this machine 74 is visible; the left part of the machine, which is laterally reversed with regard to the symmetry plane 77, was omitted for reasons of space. The machine 74 basically consists of four components: An elongated, rigid profile 78, which is used as a reference for the longitudinal axis of the machine 74 as well as for mounting of the further components of the machine. Approximately in the middle of the profile 78 a device 79 for clamping a bamboo tube 4, which is to be processed, is mounted to it. At last there are two processing devices 80, which are located at both sides of the clamping device 79, and which are likewise supported by the profile 78. In the scope of a simpler version one processing device 80 can be saved if the remaining one can be relocated to the other end of the profile 81 in a simple way, or, for instance, if the clamping device is designed to be rotatable by 180° together with a clamped bamboo tube 4.

A commercially available constructional element can be used as the profile 78. Preferably this consists of a four-cornered profile with a square cross-section, whose to long sides 82 comprise a T-shaped undercut mounting groove 83 each, which is running along the longitudinal direction of the profile, compare FIG. 13. Blocks, which are not shown, can be mounted at those grooves 83 for example at both end areas of the profile to support the machine 74.

The clamping device 79 comprises two sets of grippers 84 as well as a common actuating mechanism 85. Each set of grippers 84 is designed to grip a bar-element 4 distant to its end faces so that the end faces are free to be machined at the same time. The distance between a set of grippers 84 and to the respective end face should be 2 cm or more, for example 3 cm or more, especially 4 cm or more.

Figure 13:
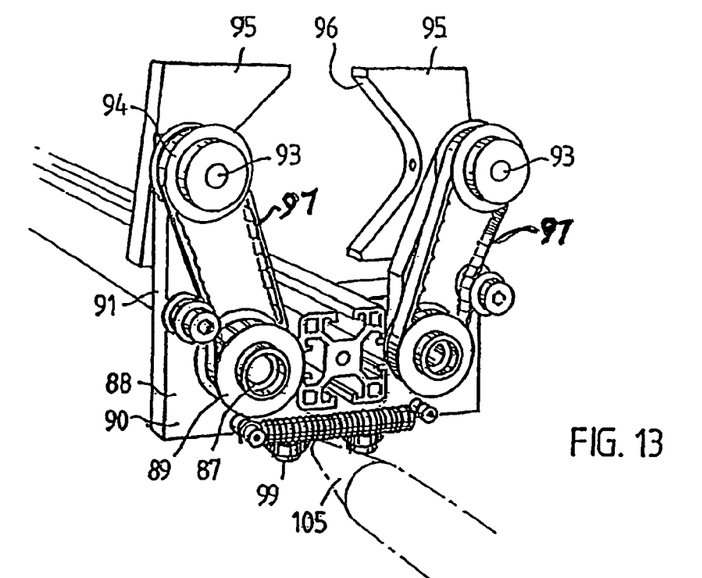
FIG. 13 is a perspective view of a clamping device of the apparatus from FIG. 12.

A set of grippers 84 is shown in FIG. 13. At both ends of the supporting profile 78, a bolt 87, which is parallel to the supporting profile 78, each is fixed in a not rotatable manner by means of lateral fastening angles 86. Onto those thus fixed bolts 87, there is plugged an upright standing plate 88 each, which comprises a through-hole for this purpose of a diameter corresponding to the diameter of the bolt. The plates 88 are limited by the concerned fastening angle 86 and are fixed at the other end of the concerned bolt 87 by a pinion 89 each which is non-turnably fixed to the bolt, for instance crimped, so that they are able to pivot around the concerned bolt 87, but not to loosen from it. The plates 88 are embodied as two-armed levers with a shorter arm 90 which protrudes downwards from the concerned mounting hole, and a longer arm 91, which protrudes upward. Both lower lever arms 90 are connected with each other through a tension spring 92, which is routed under the supporting profile 78, and are thus pulled to each other, until they are stopped by the long side 82 of the carrying profile 78. In a such case, the upper arms 91 of the plates 88 take a maximum spreaded position.

Approximately at the upper end of each plate 88, another through-hole is located for a rotating axis 93, which is pivoted there. Each of these rotating axes 93 carries a pinion 94 at one end, and, at the other end, a plate 95 whose circumference comprises a concave side 96, for instance with a course like a hyperbola.

The gear 94 as well as the plate 95 each are unturnably fixed at the rotating axis 93, to respectively crimped, clamped (clamping screw), soldered and/or welded. Otherwise the pinion 94 is coupled with regard to the rotational movement with the pinion 89 at the stationary bolt 87 through a toothed belt 97, which is kept tense by a device 98. Thus it is achieved that the spatial orientation of the upper plates 95 is kept independently from the pivoted position of the lower plates 88. This function has the same effect as a parallel guide by means of a leverage with two pivotable bars parallel to each other.

The upper plates 95 are aligned in such a way, that their concave sides 96 face each other. Therefore, when the upper lever arms 91 of the lower plates 88 are brought together, these sides 96 can approach each other in order to clamp a bamboo tube 4 in between them.

An appendix, for instance a screwed bolt 99, protruding downwards each is provided at the lower face sides of the lever arms 90 of the plates 88 for the actuation of such set of grippers 84. Here, the actuating device 85 engages.

The actuating device 85 comprises a pneumatic cylinder 100 which is located under the supporting profile 78 and which is aligned parallel to it. A conical apex 104, 105 each facing axially to the outside is fixed at the casing of the cylinder 101 as well as at the piston through a rod 102, 103 each which is coaxial to the axis of the cylinder. The two rods 102, 103 pass through one bearing block 106, 107 each, through which the complete actuating device 85 is supported at the underside of the supporting profile 78 so that it is movable in its longitudinal direction in a guided manner.

As the casing of the cylinder 101 itself is not fixed, it can move in the longitudinal direction of the supporting profile 78 in a limited way. If the pneumatic cylinder 100 is extended pneumatically, the conical apexes 104, 105 move in between the pair of appendices protruding downside, in particular in between the bolts 99, of one set of grippers 84 each, and press those apart. Thus the upper levers 91 are pivoted to the inside, and the bar-element 4 is clamped in the area of both of its ends 73 in between two concave brackets 95, 96, each. Thereby, a centrification of the two ends 73 symmetrical to the vertical longitudinal plane of the supporting profile 78 takes place, because the conical apexes 104, 105 act evenly on the two arms 90 of a set of grippers 84. The centrification with regard to the height is obtained through the concave shape of the clamping brackets 96. Thereby, the exact dimensions, for instance the diameter of a bar-element 4, are not important, as the pneumatic cylinder 100 moves in the longitudinal direction by itself until equal forces act on all arms 90.

A bar-element 4 centred in such manner is afterwards machined in the area of its both ends, i.e. surface areas 75, 76 which are projecting above a predetermined measure are ablated. This is achieved by one machining device 80 each.

Each machining device 80 comprises a slide 108, which is movable along the supporting profile 78, having a device 109 for mounting a drilling machine 110 under simultaneous alignment of the drill chuck coaxial to a processing axis, which is running in the centre above the supporting profile 78 as well as at a height determined by that area of the concave clamping brackets 96, which is receded the most.

If the slide 108, which for instance is movable in parallel orientation through lateral rolls 111 engaging into the longitudinal groove 83, is moved to the concerned end 73 of a clamped bamboo tube 4, thus the rotational axis of a machining tool 113 which is clamped into the chuck 112 of the drilling machine 110 remains always coaxial to the longitudinal axis of the bar-element 4, which is predetermined by the previously explained clamping.

Figure 14:
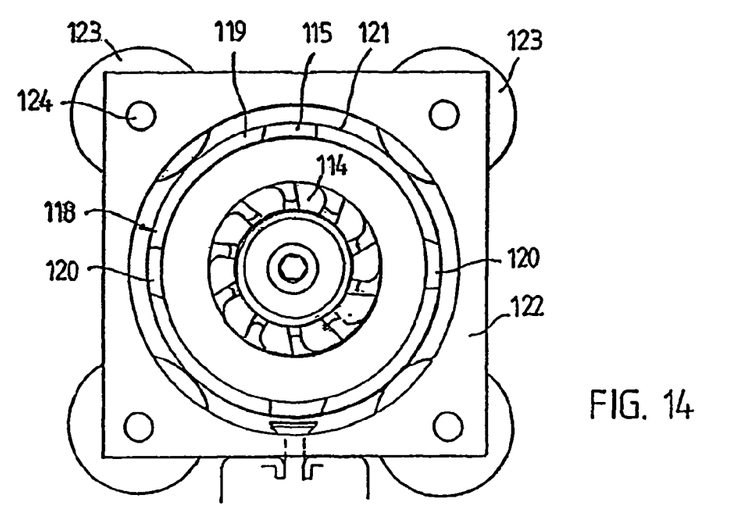
FIG. 14 is a front view in the direction of the arrow XIV to the tool from FIG. 12; as well as FIG. 15 is a section through two coaxially joined bar-elements.

The machining tool 113, which acts on the inner and outer side 75, 76 of the bamboo tube 4 at the same time, is shown in FIG. 14 in a front view. It comprises an inner and an outer cutting tool 114, 115, to which the machining of the inner side 75 respectively of the outer side 76 of the bar-element 4 is allotted.

The inner cutting tool 114 has the shape of a milling cutter, in particular of a shell end mill, with a backward mounting appendix for clamping it into the chuck 112. This cutting tool 114 enters into the cavity of a bamboo tube 4 in order to process its inside wall 75 at least in selected areas to a cylindrical shape.

Another part is fixed at the shaft of cutting tool 114, which has a bell-shaped form similar to the outer part of the tool 56. Although it could be casted integrally for example, the illustrated embodiment consists of a part shaped like an annular ring 116 at the one hand and at the other hand of a cylindrical part 118 which is fixed to the first.

At the part shaped like an annular ring 116, a backward, cylindrical appendix 117 is located which is penetrated by a threaded hole running in a radial direction in order to accommodate a clamping screw. With this clamping screw the part shaped like an annular ring 116 is fixed at the shaft of the cutting tool 114.

By means of screws which are penetrating the part shaped like an annular ring 116, this is fixed to the cylindrical part. At the front side 119 of the latter, several teeth 120 are cut out, whose edges respectively tips are slightly bent inwards. When feeding the processing tool 113, the outer surface 76 of the bamboo tube 4 is machined by these teeth 120 in order to create surfaces which run along lateral surfaces of cylinders at least in selected areas, and which permit the insertion of the end 73 of a bamboo tube into a corresponding recess 9 of a connection-element 1, 14, 21, 34, 38.

In order to prevent that the cutting tools 114, 115, which as necessary due to an irregular growth act asymmetrically upon the end 73 of the bar-element 4 during this machining, may generate vibrations of the machining tool 113, this is additionally supported at the outer lateral surface 121 of the cylindrical part 118. This is accomplished by another trestle 122 fixed to the supporting profile 78, which is encasing the cylindrical part 118 and comprises several, preferably three or four rolls 123, which can revolve around rotating axes 124 parallel to the rotational axis of the processing tool 113 respectively parallel to the longitudinal axis of the supporting profile 78. These rolls 123 push against the outer lateral surface 121 of the machining tool 113 from different sides, for instance from directions displaced by 90° or 120° against each other, so that vibrations are reliably prevented.

Both machining tools 13 placed at different end faces of a bar-element 4 are aligned with each other and rotate around the same, common axis. On the other hand, both machining tools 13 should be driven in opposite directions of rotation around the common axis, so that the resulting torque applied to the machined bar-element 4 is rather small, about zero.

When producing bar-elements 4 and connection-elements 1, 14, 21, 34, 38, 52 fitting into each other, it should be kept in mind that the axial length of an end area 73 of a bar-element 4 machined by ablation is equal or preferably slightly shorter than the depth of the annular recess 9 in the concerned connection-element 1, 14, 21, 34, 38, 52 which should accommodate it, so that the area 73 of a bamboo tube 4 exposed in this manner, i.e. liberated of its water-repellent coating, is covered by the connection-element 1, 14, 21, 34, 38, 52 and a layer of glue or the like as applicable.

Besides bamboo tubes also wooden bars 125, 126, for instance of weak wood, can be used as bar-elements 4 with the system according to the present invention, which may either be directly employed as solid wooden bars or can be furnished with a coaxial drilling 127 completely or partly passing through it, for instance in order to favour a crack-free shrinking during the seasoning.

Figure 15:
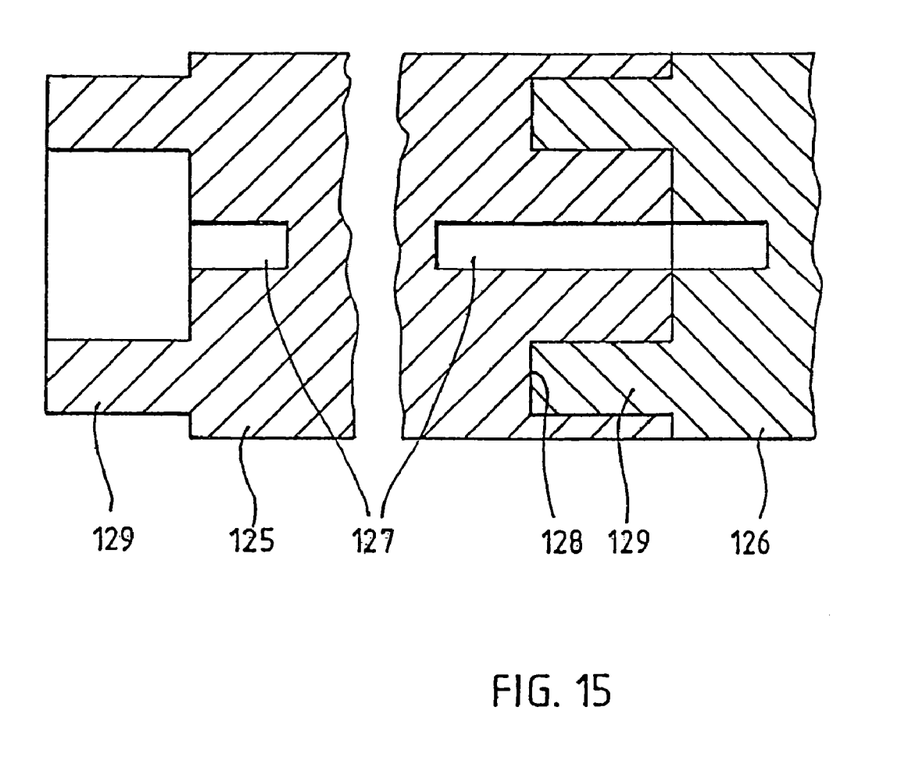

As necessary, such wooden bars 125, 126 can be put together in coaxial alignment for the purpose of elongating them, as shown in FIG. 15. For this purpose, the ends of adjoining bars 125, 126, which are to be put together, have embodiments fitting into each other: For example, an annular groove 128 is located at the face side of one bar 125, a complementary annular tongue 129 is located at the face side 126 of the other bar. Together, those form a form-fitting plugging connection, which can be fixed for instance by applying glue at the surfaces of a plugging element 128, 129. Besides, it is also possible to press or glue one threaded element each into a central drill hole 127—a threaded nut in the first and a threaded bolt in the other—, so that such bar-elements 125, 126 can also be screwed together—additionally to the form-fitting plugging connection.

The invention claimed is:

1. A system for supporting a framework, the system comprising bar-elements joinable to form a truss, and connecting elements insertable between said bar-elements at all junctures where two or more bar-elements, whose longitudinal axes are not coaxial to each other, are joined, wherein
   a) each of said bar-elements comprises at least a portion of a material selected from high-growing plants comprising deciduous trees, coniferous trees, palm trees, giant grasses and bamboo plants, and
   b) each of said connecting elements comprises a selected rigid, regenerative material comprising raw material built up by plants using photosynthesis, including wood; wherein
   c) at least one end of a bar-element, a connecting element to be mounted to said bar-element, and at least one end of a further bar-element to be connected to said connecting element, are provided with surfaces configured as geometrical bodies at least in selected areas,
   d) such that at a joint between at least one end of a selected one of said bar-elements and said connecting element to be mounted to said selected bar-element, or the further bar-element, each exhibits at least in a selected area a surface which extends along a surface generated by a selected one of a cylinder, a cone, a prism and a pyramid, as well as at least in another selected area a surface configured as a selected one of a hollow cylinder, a hollow cone, a hollow prism and a hollow pyramid,
   e) whereby multiple ones of said bar-elements are connected to one connecting element with two or more of said bar-elements having their longitudinal axes not coaxial to each other, and whereby said connecting element comprises at its surface multiple connecting structures in the shape of annular recesses disposed in a continuous surface, whereby each of said recesses surrounds a core which ends in a front side flush with an area surrounding said recess, the annular recess having two concentric bounding surfaces for the connection of each bar-element, which bounding surfaces permit assembly by plugging one bar-element into the annular recess of each connecting structure with two pairs of closely adjoining surfaces complementary to each other and connected together with glue in pairs.

2. The system according to claim 1, wherein the glue comprises a selected one of a resin, an artificial resin, and a polymer.

3. The system according to claim 1, wherein one of said connecting elements exhibits a discoidal shape, with a circular or ring-shaped, or a triangular, quadrilateral or hexagonal base.

4. The system according to claim 1, wherein one of said connecting elements exhibits at least one surface area of a shape which generally corresponds to a portion of a lateral surface of a hollow cylinder, for connecting to a shaft of a bar-element.

5. The system according to claim 1, wherein at least one of said bar-elements exhibits a shaft having a round shape at an outer surface thereof.

6. The system according to claim 1, wherein a bar-element which is to be inserted between two connecting elements exhibits at both ends thereof surfaces configured as a selected one of a cylinder, a cone, a prism and a pyramid arranged within or without, the surfaces which are configured as a selected one of a hollow cylinder, a hollow cone, a hollow prism and a hollow pyramid, in a selected area.

7. A method for production of a truss from bar-elements, which bar-elements are adapted to be joined, and from connecting elements, which connecting elements are to be placed between the bar-elements at joint places, wherein two or more bar-elements meet and whose longitudinal axes are not coaxial to each other, the method comprising the steps of:
   a) making each of the bar-elements from at least one segment of a material from high-growing plants comprising deciduous trees, coniferous trees, palm trees, giant grasses and bamboo plants;
   b) making each of the connecting elements from a rigid, regenerative raw material built up by plants using photosynthesis, including wood;
   c) treating at least one end of a bar-element, a connecting element to be mounted to the bar-element, and an end of a further bar-element to be connected, such that such bar-elements exhibit surfaces defining well-defined geometrical bodies, at least in selected areas; and
   d) joining at least one of said bar-elements and a connecting element, or a further bar-element, such that each of the elements exhibits at least in a selected area thereof a surface which runs along a surface generated by a cylinder, cone, prism or a pyramid, as well as at least in a further selected area a surface which runs along a hollow cylinder, hollow cone, hollow prism or hollow pyramid;

e) thereby connecting bar-elements to one of the connecting elements with two or more of the bar-elements having their longitudinal axes not coaxial to each other, the connecting element comprising at its surface multiple connecting structures, each in the shape of an annular recess, each recess surrounding a core which ends in a front side flush with an area surrounding the recess, the annular recess having two concentric bounding surfaces for the connection of each bar-element, whereby the surfaces are assembled by plugging one bar-element into the annular recess of each connecting structure with two pairs of closely adjoining surfaces complementary to each other and fixed together in pairs.

8. The method according to claim 7, comprising a further step of cutting the bodies and/or the surfaces of the parts which are to be connected.

9. The method according to claim 7, comprising the step of processing both ends of a bar-element, such that longitudinal symmetry axes of the processed areas are in line with each other.

10. The method according to claim 7, comprising the step of attaching a panelling at the connecting elements of the truss.

11. The method according to claim 7, comprising the step of using bamboo culms as the bar-elements, whose inner and/or outer lateral surfaces at the culms' ends are processed.

12. The method according to claim 11, comprising the step of processing the lateral surfaces of the end of a bamboo culm such that the wall-thickness of the culm is equal to, or less than, a selected wall-thickness.

13. The method according to claim 12, comprising the step of piercing nodes in the bamboo culm making them passable.

14. The method according to claim 11, comprising the step of drilling holes into a connecting element, which holes lead into a surface area covered by a face-side of an attached bamboo culm, such that holes join within the connecting element in order to provide a link between cavities of the attached bamboo-culms.

15. The method according to claim 14, comprising the step of using the cavity-joining holes drilled into the connection-element during the creation of the lateral surfaces at a connection-element, which holes are adapted to be plugged together with a bamboo culm, the holes being adapted to serve as a tool-guide.

* * * * *